Nov. 22, 1938.  E. KROMER  2,137,574
MOTOR FUEL SAVING APPARATUS
Filed Jan. 22, 1938  2 Sheets-Sheet 2
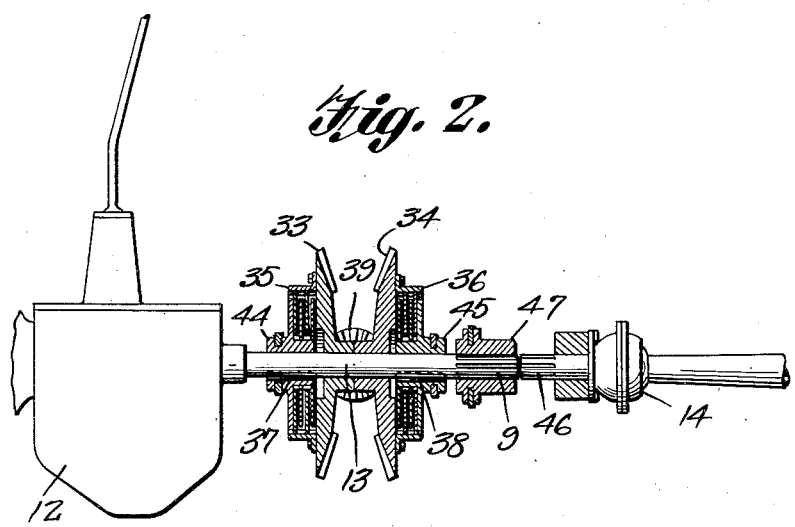
Fig. 2.
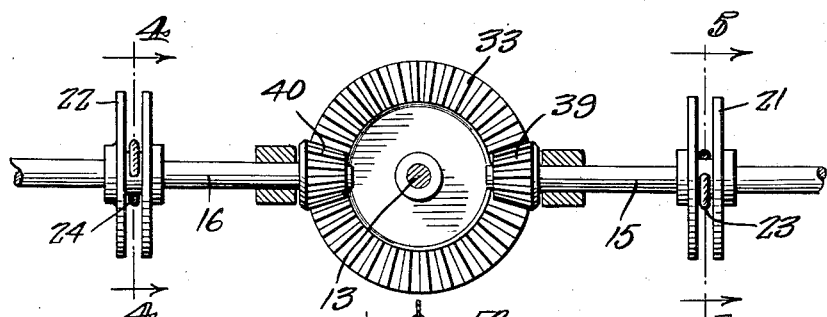
Fig. 3.
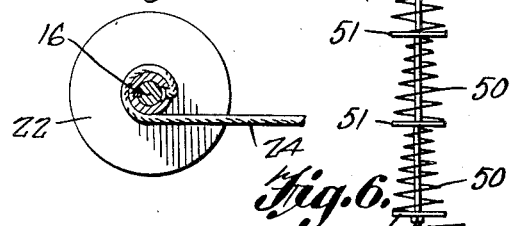
Fig. 4.
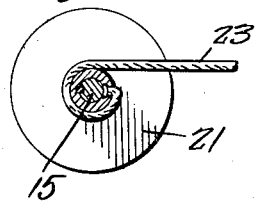
Fig. 5.
Fig. 6.
Emanuel Kromer,
INVENTOR
BY Victor J. Evans & Co.
ATTORNEYS
WITNESS Patented Nov. 22, 1938

2,137,574

UNITED STATES PATENT OFFICE 2,137,574

MOTOR FUEL SAVING APPARATUS

Emanuel Kromer, Spokane, Wash.

Application January 22, 1938, Serial No. 186,484

3 Claims. (Cl. 180—1)

This invention relates to motor fuel saving apparatus and has for an object, broadly, to provide apparatus which will promote economy of fuel used by automobiles, trucks, buses, airplanes and other motor vehicles, by conserving the potential power which is now entirely wasted, when wheel brakes are applied when stopping the vehicle, and subsequently utilizing this conserved or stored power to assist in starting the vehicle.

A more specific object is to provide apparatus adapted to transfer the potential power of the momentum of a vehicle in motion into the tensioning of coil springs, or into the compressing of air in tanks, or both, and utilizing this kinetic energy to rotate the propeller shaft of the vehicle in starting forward or in backing and thus relieve the motor of some of the work it must now do to put the vehicle in motion.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 2 is a longitudinal sectional view taken on the line 2—2 of Figure 1, parts being shown in elevation.

Figure 3 is a cross sectional view taken on the line 3—3 of Figure 3, parts being shown in elevation.

Figure 4 is a detail sectional view taken on the line 4—4 of Figure 1 showing the cable drums.

Figure 5 is a detail sectional view taken on the line 5—5 of Figure 3 showing the companion cable drum.

Figure 6 is a plan view of a modified form of spring.

Figure 1:
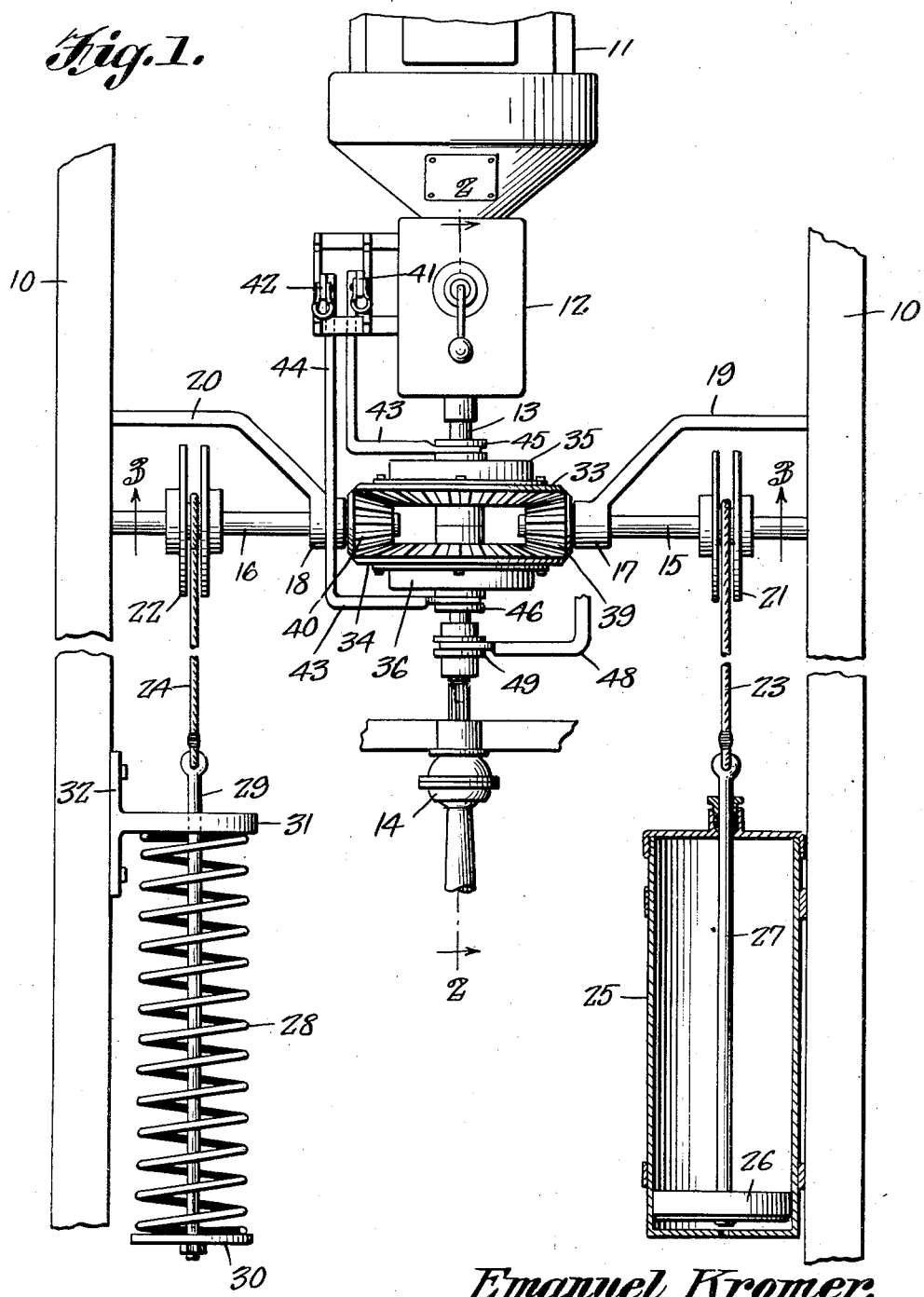
Figure 1 is a plan view of apparatus constructed in accordance with the invention and including selectively operable clutches on the propeller shaft of a vehicle and respective stub shafts for the clutches equipped with cable drums and energy storing means for the cable drums such as a spring and an air compressor.

Referring now to the drawings in which like characters of reference designate similar parts in the various views, 10 designates the longitudinal frame bars of a vehicle chassis, 11 the motor, 12 the transmission, 13 the propeller shaft, and 14 the universal joint of the propeller shaft, these parts being conventional.

In carrying out the invention a pair of stub shafts 15 and 16 are mounted in alignment transversely of the vehicle, the outer ends of the shafts being journaled in suitable bearings carried by the frame bars 10 and the inner ends of the shafts being journaled in respective bearings 17 and 18 carried by bracket arms 19 and 20 which are secured at the outer ends to the frame bars 10. The stub shafts are equipped with respective winding drums 21 and 22 to which respective cables 23 and 24 are connected.

In the present embodiment of the invention an air compressor cylinder 25 is associated with the drum 21 and is equipped with a piston 26, the stem 27 of which is connected to the cable 23 so that when the cable is wound upon the drum air will be compressed ahead of the piston to return the piston to normal position with resultant unwinding of the cable to rotate the drum 21 and rotate the shaft 15.

In this embodiment also a helical spring 28 is associated with the drum 22, the spring being provided with an axially disposed rod 29 having a stop disc 30 which bears against the free end of the spring, the opposite end of the spring bearing against a stop disc 31 which is carried by a bracket 32 secured to the adjacent frame bar 10. The rod 29 is connected to the cable 24 of the winding drum 22. When the drum is rotated in one direction the cable will be wound thereupon to compress the spring 28 which stores up energy to rotate the drum in the opposite direction with resultant rotation of the respective shaft 16.

However, if desired two or more tension members or springs may be employed, instead of a spring and a compressor cylinder or two or more compressor cylinders may be employed instead of a spring and a compressor cylinder.

A pair of bevel gears 33 and 34 are loosely mounted on the propeller shaft 13 and these gears are equipped with respective disc clutches 35 and 36. The clutches are of conventional type and are splined to the propeller shaft as shown at 37 and 38 in Figure 2, so that when either clutch is actuated the respective bevel gear will be clutched for rotation as a unit with the propeller shaft.

The stub shafts 15 and 16 are equipped with respective bevel pinions 39 and 40 which are always in mesh with both bevel gears 33 and 34 at diametrically opposite points on the bevel gears, as best shown in Figure 1. When the bevel gear 34 is clutched to the propeller shaft both bevel pinions and their respective stub shafts will be simultaneously driven in a direction to wind up the cables 23 and 24 to compress air in the cylinder 25 and tension the spring 28. This condition exists when the vehicle is slowing to a stop, the momentum of the vehicle, usually wasted, being thus utilized to store up energy in the spring and in the cylinder.

When the vehicle is not in motion, both clutches should be applied so that the gears and pinions will be locked and thus the stored up energy in the cylinder and spring will not be dissipated as would be the case were the clutches not applied. To start the vehicle in a foreward direction the rear clutch 36 is released thus permitting the stored up energy in the spring and cylinder to act through the applied clutch 35 and assist the motor in turning the propeller shaft. When the vehicle is in motion the clutch 35 is released and thereafter both clutches will idle.

When the vehicle is being put in a backward motion, assuming the bevel gear 34 is clutched to the propeller shaft, the compressed air in the cylinder 25 and the tension of the spring 28 will operate to unwind the cables 23 and 24 from the drums 21 and 22 to rotate the stub shafts 15 and 16 and turn the gear 34, thus assisting the motor in turning the propeller shaft. Thus the motor is relieved of some of the conventional strain in starting, with consequent saving in fuel consumption.

If for any reason it becomes necessary to tension the spring 28 or to compress air in the cylinder 25 independently of momentum of the vehicle, the propeller shaft to the axles may be disconnected from the engine and the engine utilized to restore tension in the spring and compress air in the cylinder by clutching the bevel gear 34. For this purpose, as best shown in Figure 2, the propeller shaft, between the universal joint 14 and the rearmost bevel gear 36, is divided and the ends provided with grooves 9.

An internally grooved sleeve 47 is adapted to be slid over both grooved ends to normally couple the ends together, and is adapted to be slid forwardly out of engagement with the rear section of the propeller shaft to disconnect the wheels from the motor. For this purpose a shift lever 48, best shown in Figure 1, is forked at the end and the forked end straddles the sleeve between collars 49. The shift lever may be shifted in either direction to disconnect the motor from the wheels or connect the motor with the wheels as will be understood.

As best shown in Figure 6, the tension spring 5 may be formed of a plurality of tapered helical springs 50 which are separated by washers 51 sleeved on a rod 52 which is provided at the free end with a stop washer 53 and which is slidably fitted in a stationary bracket 54. It may be preferable in some instances to use tension springs of this type rather than the single tension spring 28.

It will be understood that a plurality of compression cylinders, cables and drums may be used, as required by the different types and sizes of vehicles.

Since the operation of the device has been described as the description of the parts progressed it is thought that the invention will be fully understood without further explanation.

What is claimed is:

1. Apparatus of the class described comprising the combination with the propeller shaft and chassis of a motor vehicle, of oppositely disposed bevel gears loose on the propeller shaft, clutches for selectively clutching the gears to the propeller shaft, aligned shafts disposed transversely on the chassis, pinions for the aligned shafts adapted to mesh with said gears at diametrically opposite points on the gears, drums fixed to the transversely disposed shafts, cables on the drums, and means carried by the chassis and connected to the cables for storing up energy when said transversely disposed shafts are rotated in one direction to rotate the transversely disposed shafts in the opposite direction, the arrangement being such that when the vehicle is slowing to a stop said cables will be wound on the drums and when said vehicle is starting said cables will be unwound to accelerate movement of the propeller shaft.

2. Motor fuel saving apparatus including the structure recited in claim 1 and wherein said means comprises springs.

3. Motor fuel saving apparatus as recited in claim 1 and wherein said means comprises cylinders and pistons therein for compressing air.

EMANUEL KROMER.